(12) United States Patent
Watanabe et al.

(10) Patent No.: US 10,007,224 B2
(45) Date of Patent: Jun. 26, 2018

(54) POWER SUPPLY DEVICE CHANGING TARGET VOLTAGE DEPENDING ON OPERATION MODE, AND IMAGE FORMING DEVICE HAVING POWER SUPPLY DEVICE

(71) Applicant: Konica Minolta, Inc., Chiyoda-ku, Tokyo (JP)

(72) Inventors: Masayuki Watanabe, Fuchu (JP); Yuhei Tatsumoto, Toyokawa (JP); Akihiro Hayashi, Okazaki (JP); Makoto Shimazoe, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/297,663

(22) Filed: Oct. 19, 2016

(65) Prior Publication Data

US 2017/0123368 A1    May 4, 2017

(30) Foreign Application Priority Data

Oct. 30, 2015   (JP) ................................ 2015-214443

(51) Int. Cl.
*H02M 3/337* (2006.01)
*G03G 15/00* (2006.01)
(Continued)

(52) U.S. Cl.
CPC ............ *G03G 15/80* (2013.01); *H02M 3/335* (2013.01); *H02M 3/337* (2013.01); *H02M 3/338* (2013.01);
(Continued)

(58) Field of Classification Search
CPC ............................... G03G 15/80; H02M 3/337
See application file for complete search history.

(56) References Cited

U.S. PATENT DOCUMENTS

2004/0085054 A1*   5/2004   Yamada ............ H02M 3/33561
                                                        323/285
2015/0256079 A1*   9/2015   Kimura ................. G03G 15/80
                                                        363/15

FOREIGN PATENT DOCUMENTS

JP          08-211790 A      8/1996
JP          09-093924 A      4/1997
JP          2005-331583      2/2005

OTHER PUBLICATIONS

Notice of Reasons for Refusal issued in corresponding Japanese Patent Application No. 2015-214443, dated Oct. 3, 2017, with English Translation (10 pages).

* cited by examiner

*Primary Examiner* — Kyle J Moody
*Assistant Examiner* — Trinh Q Dang
(74) *Attorney, Agent, or Firm* — Buchanan Ingersoll & Rooney PC

(57) ABSTRACT

A power supply device including: a transformer generating, from an input voltage, low output voltage and high output voltage; an upper limiter circuit receiving the high output voltage and controlling the high output voltage not to exceed a maximum; a power controller performing feedback control on the input voltage so that the low output voltage matches a target voltage; an operation mode acquirer configured to acquire an operation mode of an image forming device; and a target value controller configured to change the target voltage depending upon the acquired operation mode. The target voltage when consumption amount of current with the high output voltage is relatively great ensures that the high output voltage does not fall below a minimum of a rated voltage range of the high output voltage, and is higher than the target voltage when consumption amount of current with the high output voltage is relatively small.

9 Claims, 8 Drawing Sheets

(51) Int. Cl.
  *H02M 3/338* (2006.01)
  *H02M 3/335* (2006.01)
  *H04N 1/00* (2006.01)
(52) U.S. Cl.
  CPC ..... *H04N 1/00888* (2013.01); *H04N 1/00904* (2013.01); *G03G 2215/0132* (2013.01)

POWER SUPPLY DEVICE CHANGING TARGET VOLTAGE DEPENDING ON OPERATION MODE, AND IMAGE FORMING DEVICE HAVING POWER SUPPLY DEVICE

CROSS-REFERENCE TO RELATED APPLICATIONS

This application is based on application No. 2015-214443 filed in Japan, the contents of which are hereby incorporated by reference.

BACKGROUND OF THE INVENTION (1) Field of the Invention

The present disclosure relates to a power supply device and an image forming device. In particular, the present disclosure relates to a technology for guaranteeing low electric power loss and accurate supply of voltages when load size is increased.

(2) Related Art

A typical power supply device used in an image forming device is capable of outputting multiple voltages by including multiple transformers and multiple control units each provided to control a different one of the transformers. In Japan, commercial power sources output 100 V AC power. For example, a power supply device receiving input of such power and outputting two different DC voltages, namely a low voltage (e.g., 5 V) and a high voltage (e.g., 24 V), is provided with a combination of a control circuit and a transformer for each voltage. In such structure, each combination of a control circuit and a transformer performs feedback control to output a voltage within a rated voltage range.

In view of such conventional technology, a proposal is being made of a power supply device that includes only one combination of a control circuit and a transformer that outputs both a low voltage and a high voltage, in order to reduce cost and device size. Refer to Japanese Patent Application Publication No.: H08-211790 for one example of such a power supply device. According to this technology, due to the necessity of controlling output low voltage with higher accuracy compared to output high voltage, the output low voltage is monitored for feedback control.

With such feedback control, the output high voltage may fluctuate considerably depending upon the amount of load current. In view of this, Japanese Patent Application Publication No.: H08-211790 also proposes changing the target voltage of the low voltage in the feedback control depending upon the output high voltage.

However, when the necessary amount of high voltage power increases to 300 W or greater due to certain circumstances (e.g., due to the inclusion, in an image forming device, of a sheet post-processing device that performs stapling of a stack of sheets with images formed thereon), guaranteeing accuracy of both the output low voltage and the output high voltage becomes difficult. Specifically, with the conventional technology disclosed in Japanese Patent Application Publication No.: H08-211790, accuracy of both the output low voltage and the output high voltage can no longer be guaranteed should the necessary amount of high voltage power become higher than around 200 W.

In view of this, a proposal is being made of a power supply device that includes an upper limiter circuit that limits output high voltage to be within ±10% of a rated voltage, while controlling output low voltage to be at a target voltage. Refer to Japanese Patent Application Publication No.: H09-093924 for one example of such a power supply device. However, this technology also has a drawback in that electric power loss occurs at the upper limiter circuit, and a consequent increase in power consumption occurs.

SUMMARY OF THE INVENTION

In view of such problems, the technology pertaining to the present disclosure aims to provide a power supply device and an image forming device that reduce electric power loss occurring when load size of a load to which high voltage is output is increased.

One aspect of the present disclosure is a power supply device for an image forming device that is provided with a first load and a second load that operates at a higher voltage than the first load, and that operates by switching between operation modes, the power supply device including: a transformer configured to generate, from an input voltage, a low output voltage for the first load and a high output voltage for the second load; an upper limiter circuit configured to receive the high output voltage from the transformer, and control the high output voltage not to exceed a maximum; a power controller configured to perform feedback control on the input voltage so that the low output voltage matches a target voltage; an operation mode acquirer configured to acquire an operation mode of the image forming device; and a target value controller configured to change the target voltage depending upon the acquired operation mode, the target voltage, when the acquired operation mode is a high current consumption mode, ensuring that the high output voltage does not fall below a minimum of a rated voltage range of the high output voltage, the target voltage, when the acquired operation mode is a low current consumption mode, being lower than the target voltage when the acquired operation mode is the high current consumption mode, the image forming device consuming a greater amount of current with the high output voltage in the high current consumption mode than in the low current consumption mode.

In the power supply device pertaining to one aspect of the present disclosure, preferably, when the acquired operation mode is the low current consumption mode, the greater the amount of the current with the low output voltage to be output to the first load, the lower the target voltage set by the target value controller.

In the power supply device pertaining to one aspect of the present disclosure, preferably, when the acquired operation mode is the high current consumption mode, the greater the amount of the current with the low output voltage to be output to the first load, the higher the target voltage set by the target value controller.

In the power supply device pertaining to one aspect of the present disclosure, preferably, the target voltage controller judges the amount of the current with the low output voltage to be output to the first load based on an operation state of the first load or a device structure of the first load.

In the power supply device pertaining to one aspect of the present disclosure, preferably, the first load includes at least one of a hard disk drive attached to the image forming device, a facsimile communication unit of the image forming device, and a print controller unit of the image forming device.

In the power supply device pertaining to one aspect of the present disclosure, preferably, when in the high current consumption mode, the image forming device is capable of performing image forming immediately, and when the acquired operation mode is the high current consumption mode and the current with the low output voltage is to be output to the first load at a predetermined amount or more, the target voltage set by the target voltage controller equals a minimum of a rated voltage range of the low output voltage.

In the power supply device pertaining to one aspect of the present disclosure, preferably, the target voltage controller judges the amount of the current with the high output voltage to be output to the second load based on an operation state of the first load or a device structure of the second load.

In the power supply device pertaining to one aspect of the present disclosure, preferably, the second load includes: an image reader unit of the image forming device, the image reader unit including an automatic document feeder; and a post-processor unit of the image forming device, the power-processor unit performing post-processing on a sheet stack, the sheet stack composed of one or more recording sheets already having images formed thereon, and when the acquired operation mode is the high current consumption mode and both the image reader unit and the post-processor unit are to be operated, the target voltage set by the target voltage controller equals a maximum of a rated voltage range of the low output voltage.

BRIEF DESCRIPTION OF THE DRAWINGS

These and other objects, advantages and features of the technology pertaining to the present disclosure will become apparent from the following description thereof taken in conjunction with the accompanying drawings, which illustrate specific embodiment(s) of the technology pertaining to the present disclosure.

In the drawings.

DESCRIPTION OF PREFERRED
EMBODIMENTS

The following describes an embodiment of a power supply device and an image forming device pertaining to the present disclosure, with reference to the accompanying drawings.

[1] Structure of Image Forming Device 1

The following describes the structure of an image forming device pertaining to the embodiment.

Figure 1:
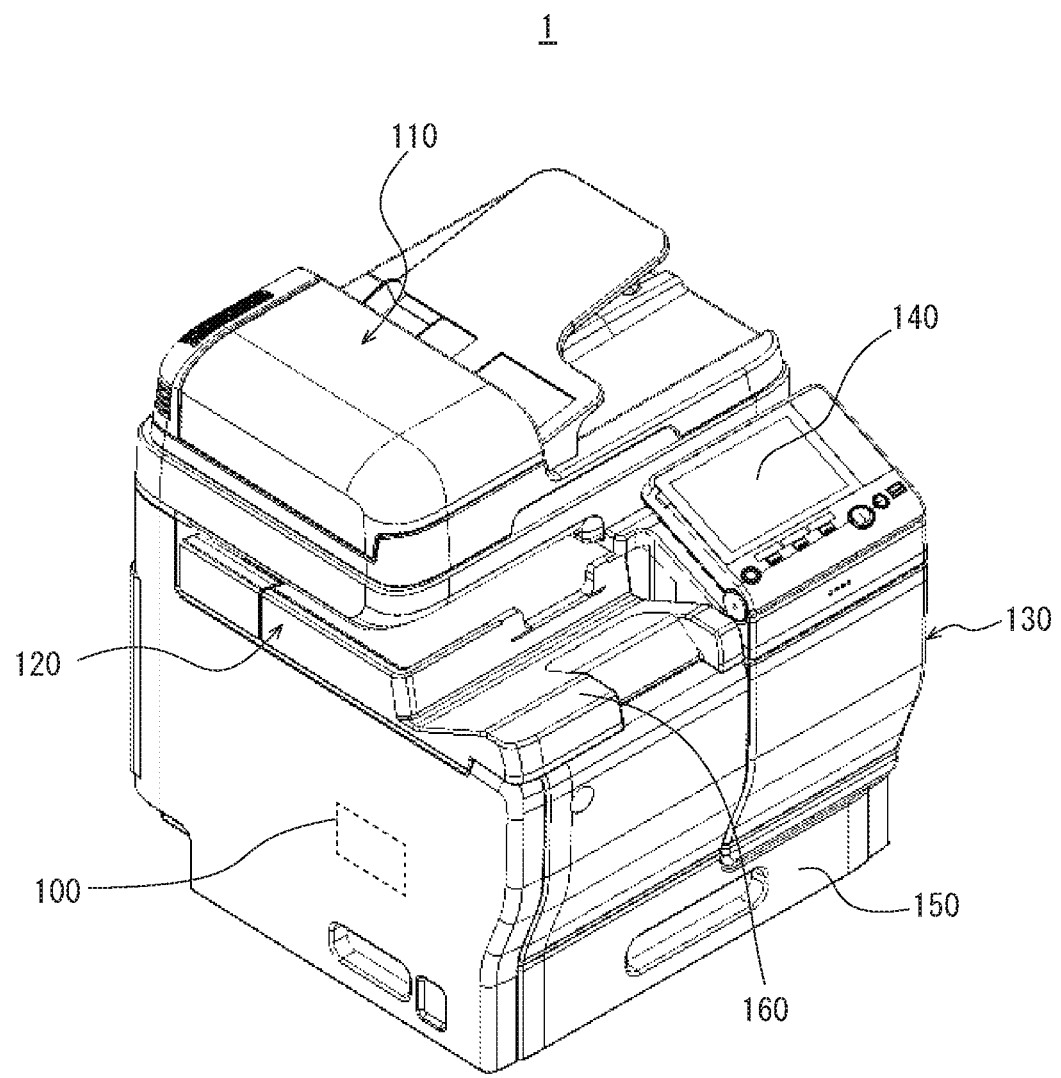
FIG. 1 is a perspective view illustrating the appearance of an image forming device 1 pertaining to an embodiment of the technology pertaining to the present disclosure.

The image forming device pertaining to the embodiment is a multi-function peripheral (MHP) having a so-called tandem system. The image forming device pertaining to the embodiment has, for example, a scanner function, a color printer function, a copier function, and a facsimile function. FIG. 1 illustrates the image forming device pertaining to the embodiment as image forming device 1. The image forming device 1 includes: an image reader 110; a sheet post-processor 120; and an image former 130. The image reader 110 includes an automatic document feeder (ADF) and a scanner. The ADF feeds documents one by one to the scanner, and the scanner generates image data for each document.

The sheet post-processor 120 is arranged inside an in-body space of the image forming device 1 that is located between the image reader 110 and the image former 130. The sheet post-processor 120 performs post-processing including alignment and stapling with respect to a sheet stack ejected from the image former 130 after image forming. Here, the sheet stack may be composed of only one recording sheet or two or more recording sheets. A sheet stack having received post-processing at the sheet post-processor is ejected onto a paper eject tray 160 attached to a front side of the image former 130.

The image former 130 forms an image on each recording sheet P supplied from a paper feeder 150. The image former 130 performs the image forming based on image data generated by the image reader 110 or image data received from other devices. Each recording sheet P carrying an image formed thereon by the image former 130 is ejected to the sheet post-processor 120. Further, the image former 130 has an operation panel 140. For example, the operation panel 140 provides visual presentation of information to users of the image forming device 1 and receives instructions from users of the image forming device 1. In addition, the image former 130 includes a power supply device 100. The power supply device 100 receives 100 V AC power from a commercial AC power source, and supplies DC power to components of the image forming device 1.

Figure 2:
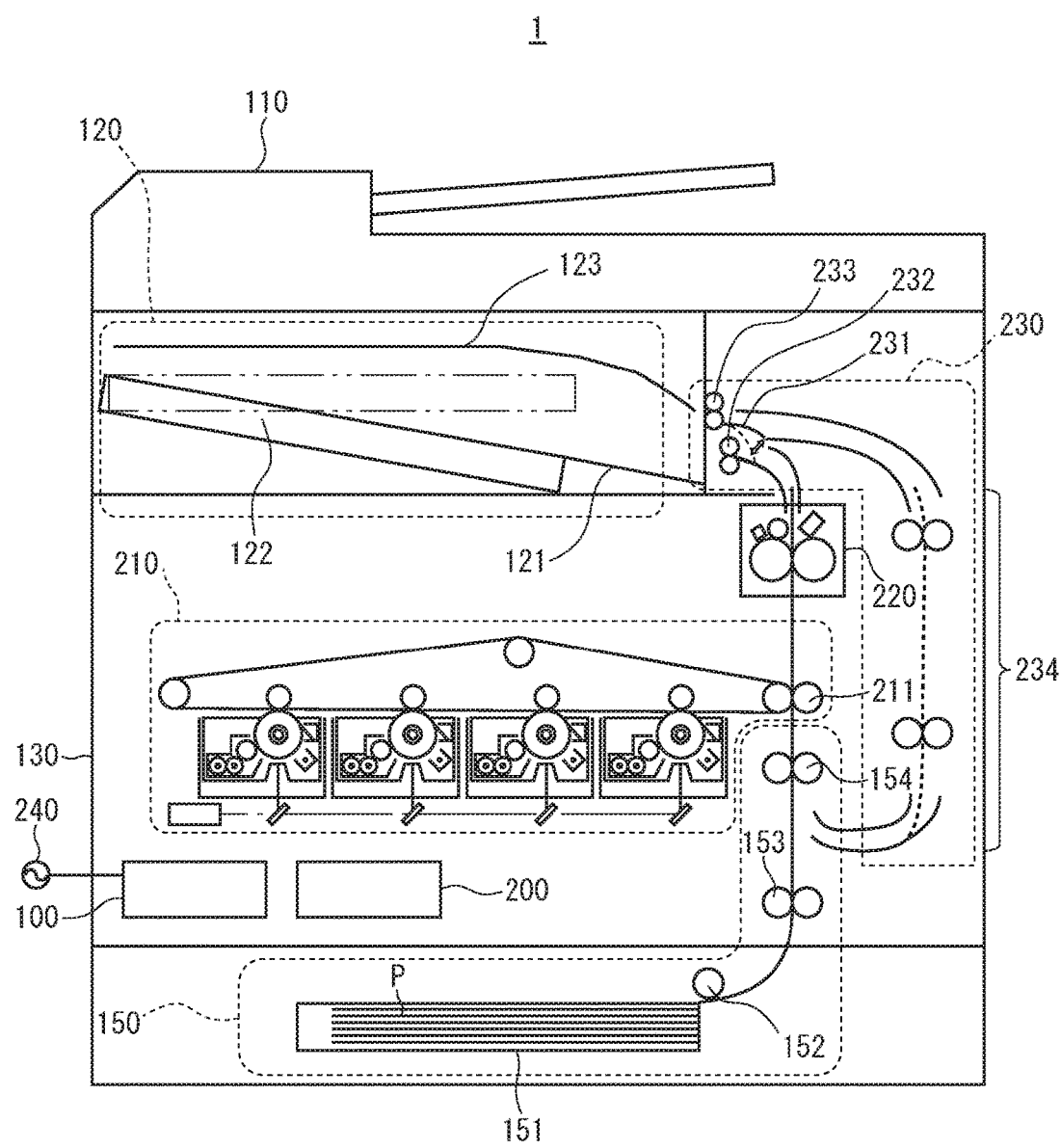
FIG. 2 illustrates main components of the image forming device 1.

FIG. 2 illustrates main components of the image forming device 1. As illustrated in FIG. 2, the image former 130 includes a control unit 200 and an imaging unit 210. The control unit 200 receives image data from the image reader 110 or from other devices. When the control unit 200 receives image data for one recording sheet P, the imaging unit 210 forms a toner image corresponding to the image data. Here, the toner image that is formed may be a color toner image or a monochrome toner image. When the imaging unit 210 forms a color toner image, the color toner image is formed by superimposing toner images of the colors yellow, magenta, cyan, and black one over another. The paper feeder 150 picks up recording sheets P housed in a paper feeder cassette 151 one by one by using a pick-up roller 152. The paper feeder 150 thus feeds a recording sheet P to the image former 130.

The recording sheet P having been fed to the image former 130 is transported further by transport rollers 153 to timing rollers 154. The timing rollers 154 transport the recording sheet P to image transfer rollers 211 at an appropriate timing, where the recording sheet P receives transfer of a toner image. Subsequently, the toner image having been transferred onto the recording sheet P is heat-fixed onto the recording sheet P at a fixing device 220, before being transported to a paper eject unit 230.

When an image is to be formed only on a front side of the recording sheet P, the recording sheet P is guided to paper eject rollers 232 by a guiding claw 231 in the paper eject unit 230. After being guided to the paper eject rollers 232, the recording sheet P is ejected onto the sheet post-processor 120. When one or more recording sheets P composing a sheet stack have been ejected onto the sheet post-processor 120, the sheet post-processor 120 ejects the sheet stack to the paper eject tray 160 after performing post-processing on the sheet stack or without performing any post-processing on the sheet stack. Here, whether the sheet post-processor 120 performs or does not perform post-processing depends upon user instruction.

Meanwhile, when images are to be formed on both sides of the recording sheet P, the recording sheet P is guided to reverse rollers 233 by the guiding claw 231. The reverse rollers 233 first cause the recording sheet P to advance on and along a reverse guide plate 123, and then stop the recording sheet P from advancing any further with the trailing end of the recording sheet P between the reverse rollers 233. Subsequently, the reverse rollers 233 rotate in the opposite direction to send the recording sheet P onto a reverse path 234.

After the recording sheet P travels through the reverse path 234, an image is formed on the back side of the recording sheet P. Then, the recording sheet P is ejected onto the sheet post-processor 120. Processing following this point is similar to that described above when an image is formed only on the front side of the recording sheet P. That is, when one or more recording sheets P composing a sheet stack have been ejected onto the sheet post-processor 120, the sheet post-processor 120 ejects the sheet stack to the paper eject tray 160.

Note that the image forming device 1 is provided with an undepicted drive motor that achieves the rotation of rollers (e.g., the pickup roller 152, the transport rollers 153, the timing rollers 154, the image transfer rollers 211, the paper eject rollers 232, and the reverse rollers 233). Further, the image forming device 1 is provided with a clutch that is operable to transfer the drive force of the drive motor to the rollers, and that is also operable not to transfer the drive force to the rollers. In addition, the image forming device 1 may be provided with a solenoid for purposes such as the transport of recording sheets P.

Further, the image forming device 1 is provided with a fan for discharging high temperature air inside the device to the outside of the device and thus discharge heat generated by components such as the fixing device 220.

Further, the control unit 200 includes a control circuit that, via the operation panel 140, provides information to users of the image forming device 1 and receives instructions from users of the image forming device 1. The control circuit is connected to a hard disk drive (HDD) that stores image data. In addition, the control unit 200 is connected to a LAN and is capable of, for example, receiving print jobs from other devices and transmitting/receiving facsimile data.

Further, the operation panel 140 includes a liquid crystal display (LCD), and the LCD includes light-emitting diodes (LED) providing LCD backlight.

The power supply device 100 receives power from the AC power source 240, and outputs DC power to the components of the image forming device 1. Specifically, the power supply device 100 is capable of outputting DC power with two different voltages, 24 V and 5 V. For example, the 24 V DC power is supplied to the motor, the clutch, the solenoid, and the fan, among the components described above. Thus, the image reader 110 receives the 24 V DC power, in order to cause the ADF and the like to operate. Further, the sheet post-processor 120 also receives the 24 V DC power. In the following, loads receiving the 24 V DC power are referred to as 24 V loads. Meanwhile, the 5 V DC power is supplied to the loads described in the following (referred to as 5 V loads). For example, the 5 V loads include the control unit 200 and the operation panel 140.

[2] 5 V Loads

The following describes the 5 V loads. The 5 V loads include the control unit 200 and several other components that are controlled by the control unit 200.

Figure 3:
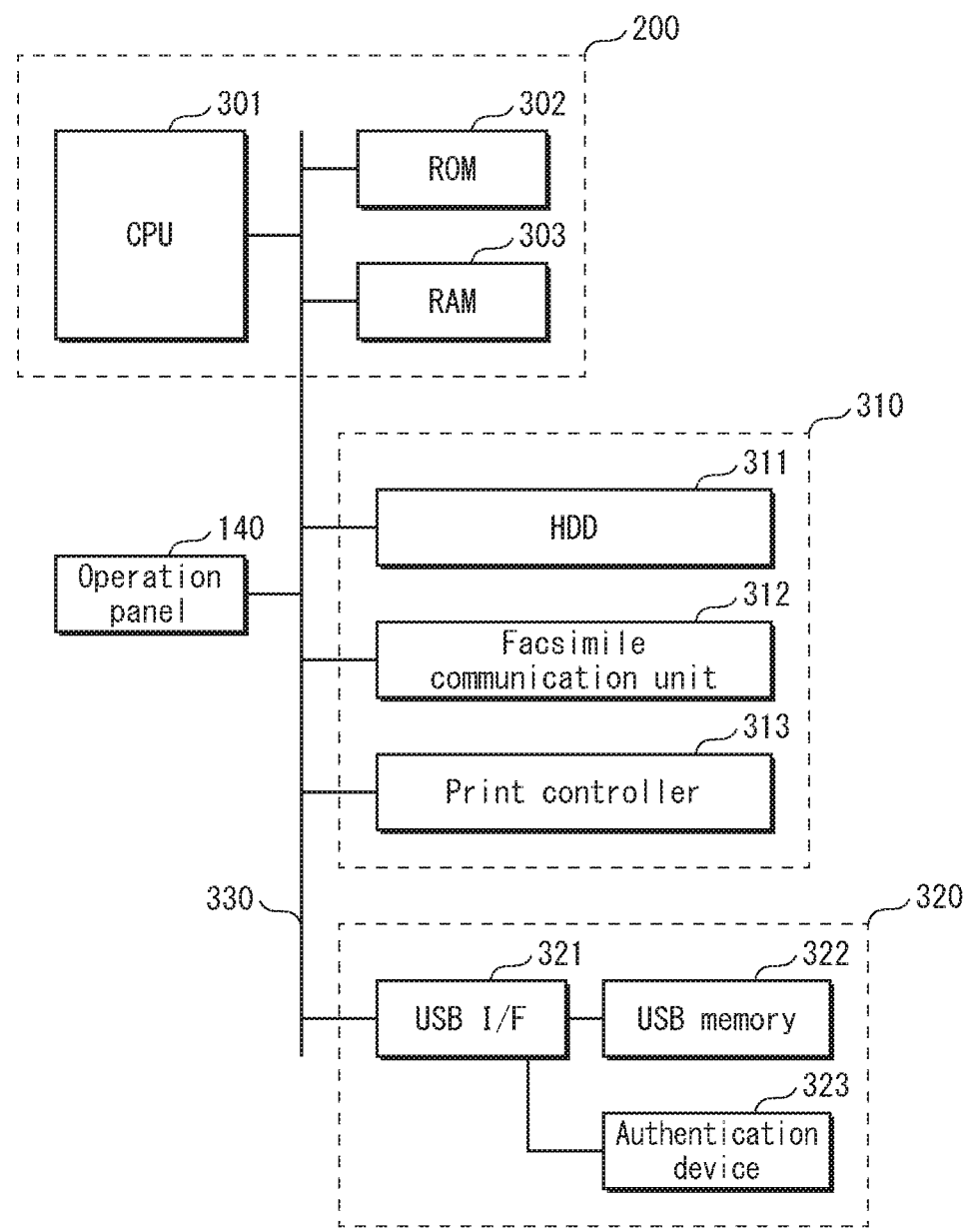
FIG. 3 is a block diagram illustrating the structure of 5 V loads.

As illustrated in FIG. 3, the 5 V loads are classified into (i) main 5 V load components, (ii) first additional 5 V load components 310, and (iii) second additional 5 V load components 320. In the embodiment, the main 5 V load components include the control unit 200 and the operation panel 140. The first additional 5 V load components 310 include a hard disk drive (HDD) 311, a facsimile communication unit 312, and a print controller 313. The second additional 5 V load components 320 include a Universal Serial Bus (USB) interface (I/F) 321, a USB memory 322, and an authentication device 323.

The control unit 200 includes: a central processing unit (CPU) 301; a read-only memory (ROM) 302; and a random access memory (RAM) 303. When the image forming device 1 is turned on, the CPU 301 reads out a boot program from the ROM 302 and launches the boot program, and operates while using the RAM 303 as a working storage. The CPU 301 also performs processing by reading programs, image data, etc., from the HDD 311.

The operation panel 140 includes a touch panel and one or more hardware keys, and receives control from the control unit 200 via a bus 330. The touch panel is composed of a touch pad and an LCD. The LCD is composed of a liquid crystal panel and LED backlight, both of which operate by receiving the 5 V DC power.

The facsimile communication unit 312 is controlled by the control unit 200, and performs facsimile communication with other devices. The print controller 313 is also controlled by the control unit 200, and controls the operations of the paper feeder 150, the imaging unit 210, the fixing device 220, and the paper eject unit 230 to perform image forming based on image data stored in the HDD 311.

The USB I/F 321 is used by the control unit 200 for accessing USB devices. In the embodiment, the USB memory 322 and the authentication device 323 are connected to the control unit 200 via the USB I/F 321.

The control unit 200 is capable of storing image data to the USB memory 322 and reading image data from the USB memory 322. Further, the authentication device 323 performs authentication of users attempting to use the image forming device 1. For example, the authentication device 323 performs authentication by using biometrics such as user fingerprints, and notifies the result of the authentication to the control unit 200.

[3] Operation Modes of Image Forming Device 1

The following describes operation modes of the image forming device 1

The operation modes of the image forming device 1 include a sleep mode, a standby mode, a scan mode, and a print mode.

The image forming device 1, in the print mode, may simply perform only image forming, may perform image forming while performing document reading with the image reader 110, or may perform image forming while performing sheet post-processing with the sheet post-processor 120. In addition, the image forming device 1, in the print mode, may perform image forming while operating both the image reader 110 and the sheet post-processor 120. In this case in particular, a great amount of 24 V current needs to be output. Note that in any case, the image forming device 1 performs image forming by operating the image former 130 and the paper feeder 150.

The image forming device 1, in the sleep mode, does not cause any of the 5 V loads or any of the 24 V loads to operate. Thus, the amount of current to be output from the power supply device 100 is smallest when the image forming device 1 is in the sleep mode.

The image forming device 1, in the standby mode, causes only the 5 V loads to operate. Further, the image forming device, in the scan mode, causes the 5 V loads to operate, and in addition, causes only the image reader 110 among the 24 V loads to operate. Due to this, the amount of current to be output from the power supply device 100 in the standby mode and the scan mode is in between the amount of current to be output from the power supply device 100 in the print mode and the amount of current to be output from the power supply device 100 in the sleep mode.

Thus, the print mode can be referred to as a high current consumption mode. Meanwhile, each of the sleep mode, the standby mode, and the scan mode can be referred to as a low current consumption mode.

[4] Structure of Power Supply Device 100

The following describes the structure of the power supply device 100.

Figure 4:
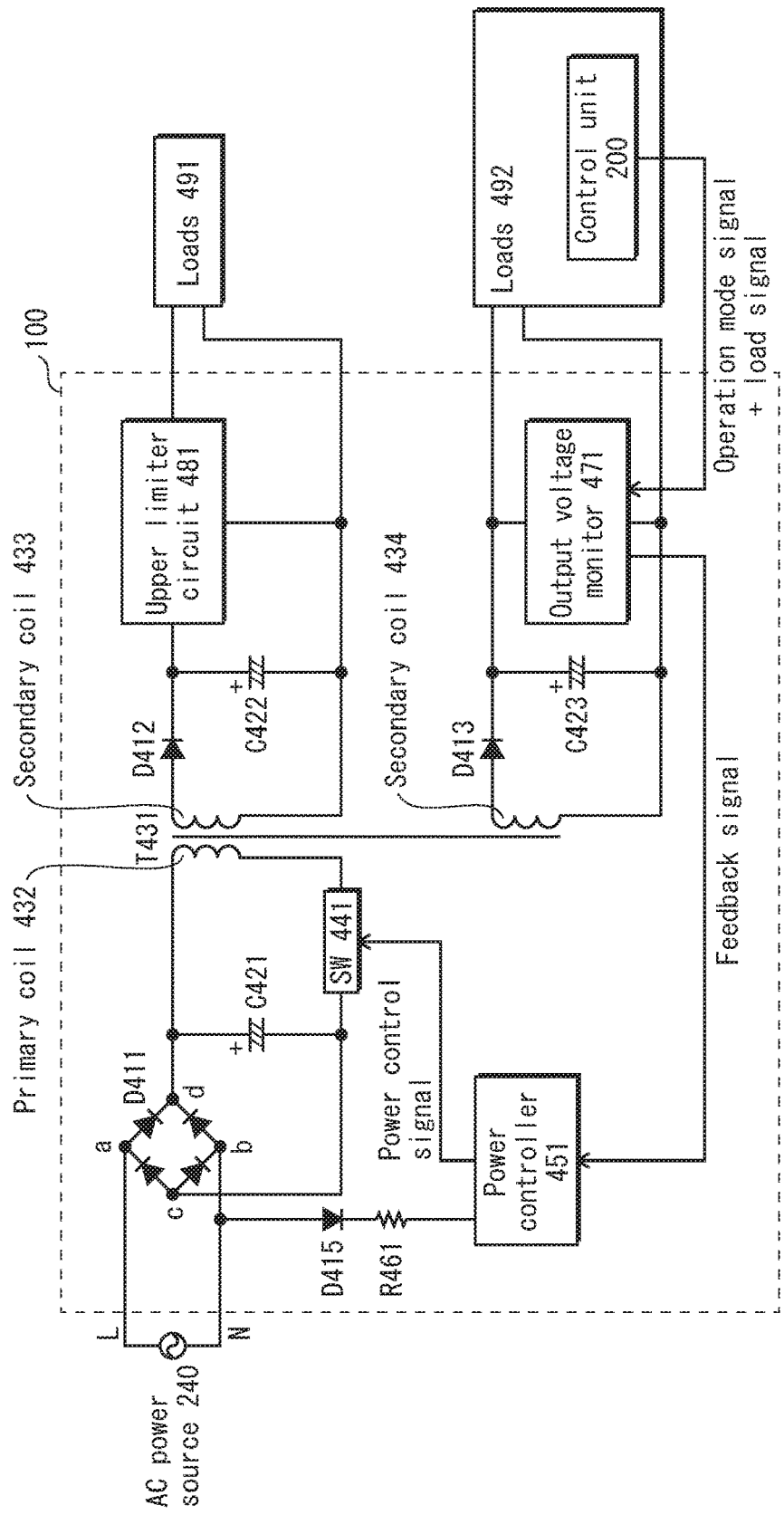
FIG. 4 illustrates main components of a power supply device 100.

FIG. 4 illustrates the main components of the power supply device 100. As illustrated in FIG. 4, the power supply device 100 is a so-called AC/DC switching converter. The power supply device 100 receives 100 V AC power from the commercial AC power source 240 and supplies the 24 V loads (indicated by reference symbol 491 in FIG. 4) and the 5 V loads (indicated by reference symbol 492 in FIG. 4) with power.

In the power supply device 100, point a of a bridge rectifier D411 is connected to line L of the AC power source 240, and point b of the bridge rectifier D411 is connected to line N of the AC power source 240. The bridge rectifier performs full-wave rectification of the AC power. Further, in the power supply device 100, a positive terminal of a primary smoothing capacitor C421 is connected to point d of the bridge rectifier D411, and a negative terminal of the primary smoothing capacitor C421 is connected to point c of the bridge rectifier D411. The primary smoothing capacitor C421 smoothens the full-wave rectified power.

Further, in the power supply device 100, a starting power terminal of a power controller 451 is connected to line N of the AC power supply 240 via a rectifier diode D415 and a starting resistor R461. Thus, the power controller 451 receives supply of starting power from the AC power supply 240. Further a primary coil 432 of a transformer T431 and the primary smoothing capacitor C421 are connected in parallel via a switch SW441, with the switch SW441 connected to the negative terminal of the primary smoothing capacitor C421. The switch SW441 switches on and off, to control voltages output to the secondary coil 433 and a secondary coil 434 of the transformer T431.

The secondary coil 433 and a rectifier diode D412 compose a series circuit. This series circuit is connected in parallel with a smoothing capacitor C422, with a cathode terminal of the rectifier diode D412 connected to a positive terminal of the smoothing capacitor C422. This parallel circuit is further connected in parallel with an upper limiter circuit 481, which limits 24 V output to be no greater than a predetermined maximum voltage.

The secondary coil 434 and a rectifier diode D413 compose a series circuit. This series circuit is connected in parallel with a smoothing capacitor C423, with a cathode terminal of the rectifier diode D413 connected to a positive terminal of the smoothing capacitor C423. This parallel circuit is further connected in parallel with an output voltage monitor 471. The output voltage monitor 471 compares 5 V output with a target voltage value, and outputs a feedback signal indicating the difference between the output voltage and the target voltage value to a feedback terminal of the power controller 451.

The output voltage monitor 471 receives, from the control unit 200, a combination of an operation mode signal indicating an operation mode of the image forming device 1, and a load signal indicating job load size. According to these signals, the output voltage monitor 471 changes the target voltage value that it uses depending upon the operation mode of the image forming device 1.

The power controller 451 inputs, to the switching element SW441, a power control signal that is in accordance with the feedback signal. This achieves pulse width modulation (PWM) control of output voltage.

[5] Operations of Power Supply Device 100

Figure 5:
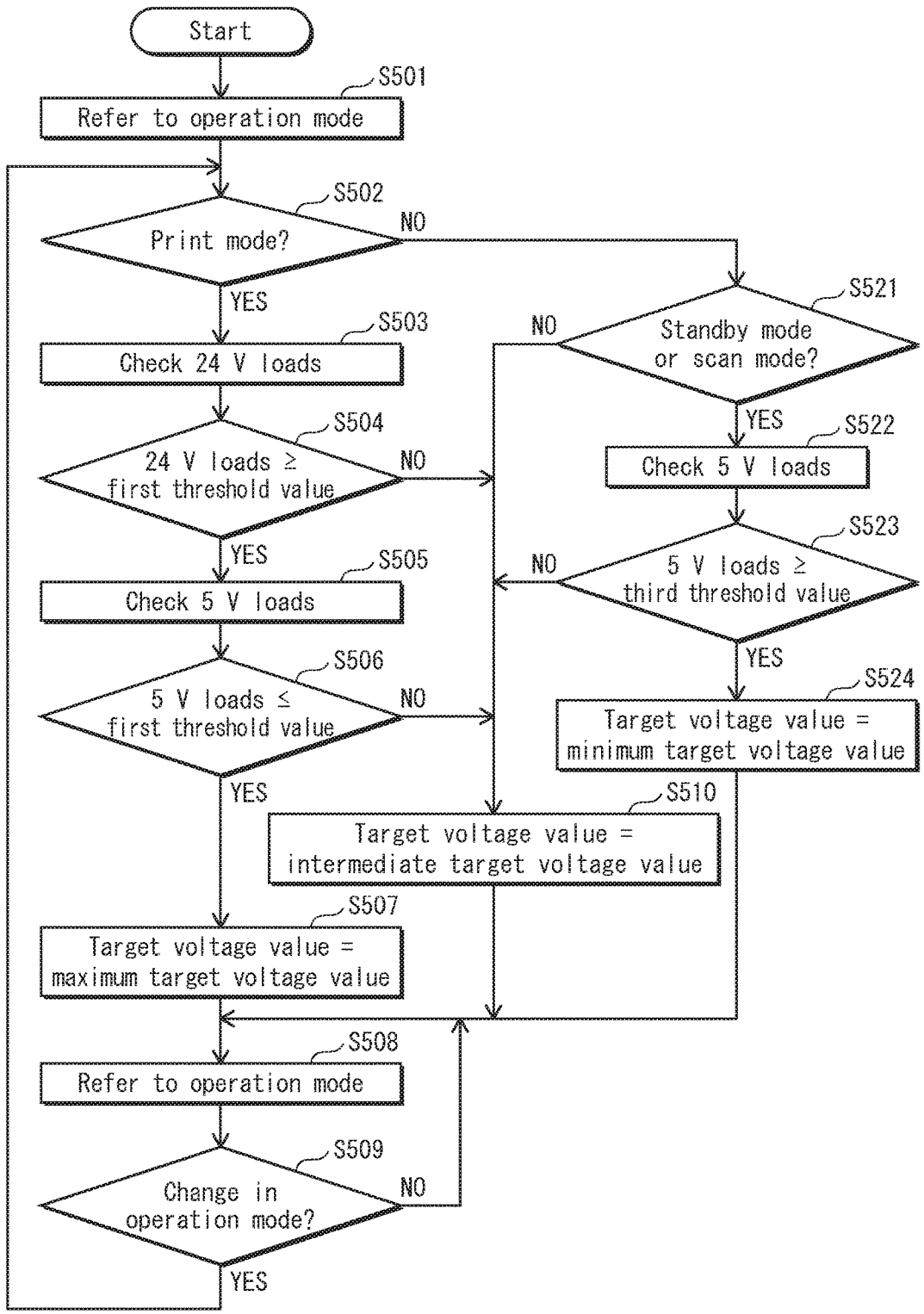
FIG. 5 is a flowchart illustrating main operations of the power supply device 100.

The following describes operations of the power supply device 100, with reference to FIG. 5, which is a flowchart illustrating main operations of the power supply device 100.

The power supply device 100 refers to the operation mode signal from the control unit 200 (S501). When the operation mode signal indicates that the operation mode of the image forming device 1 is the print mode (YES in S502), the power supply device 100 checks the operation state of the 24 V loads (S503).

In the embodiment, the power supply device 100 changes the target voltage value that it uses depending upon the operation state of the 24 V loads. Specifically, the power supply device 100 judges that total load size of the 24 V loads is no smaller than a predetermined first threshold value (YES in S504) when judging that both the image reader 110 and the sheet post-processor are to be operated, according to the load signal. When YES in S504, the power supply device 100 then checks the operation state of the 5 V loads (S505).

The power supply device 100 judges that total load size of the 5 V loads is no greater than a predetermined second threshold value (YES in S506) when judging that only the main 5 V load components among the 5 V loads are to be operated according to the load signal. When YES in S506, the power supply device 100 uses a maximum target voltage value (S507). In the embodiment, the maximum target voltage value is, for example, 5.1 V.

Meanwhile, when the operation mode signal indicates that the operation mode is not the print mode (NO in S502) and indicates that the operation mode is either the standby mode or the scan mode (YES in S521), the power supply device 100 checks the operation state of the 5 V loads without checking the operation state of the 24 V loads (S522). In subsequent S523, the power supply device 100 judges that the total load size of the 5 V loads is no smaller than a predetermined third threshold value (YES in S523) when the main 5 V load components, the first additional 5 V load components 310, and the second additional 5 V load components 320 are all to be operated, according to the load signal. When YES in S523, the power supply device 100 uses a minimum target voltage value (S524). In the embodiment, the minimum target voltage value is, for example, 4.9 V. Further, the predetermined third threshold value is greater than the predetermined second threshold value.

Meanwhile, in the following cases, the power supply device 100 uses an intermediate target voltage value (S510): (i) when the operation mode is not the print mode, the standby mode, or the scan mode (NO in S521); (ii) when the operation mode is the print mode and at least one of the image reader 110 and the sheet post-processor 120 is not to be operated (NO in S504); (iii) when the operation mode is the print mode and at least one of the first additional 5 V load components 310 and the second additional 5 V load components 320, in addition to the main 5 V load components, are to be operated (NO in S506); and (iv) when the operation mode is the standby mode or the scan mode and at least the second addition 5 V load components 320, among the 5 V loads, are not to be operated (NO in S523). In the embodiment, the intermediate target voltage value is, for example, 5.0 V.

Following processing in either S507, S510, or S524, the power supply device 100 refers to the operation mode signal once again (S508) and, when there has been no change in operation mode (NO in S509), proceeds to S508 and continues monitoring the operation mode. Meanwhile, when there has been a change in operation mode (YES in S509), the power supply device 100 proceeds to S502 to repeat the processing described above once again.

Figure 6:
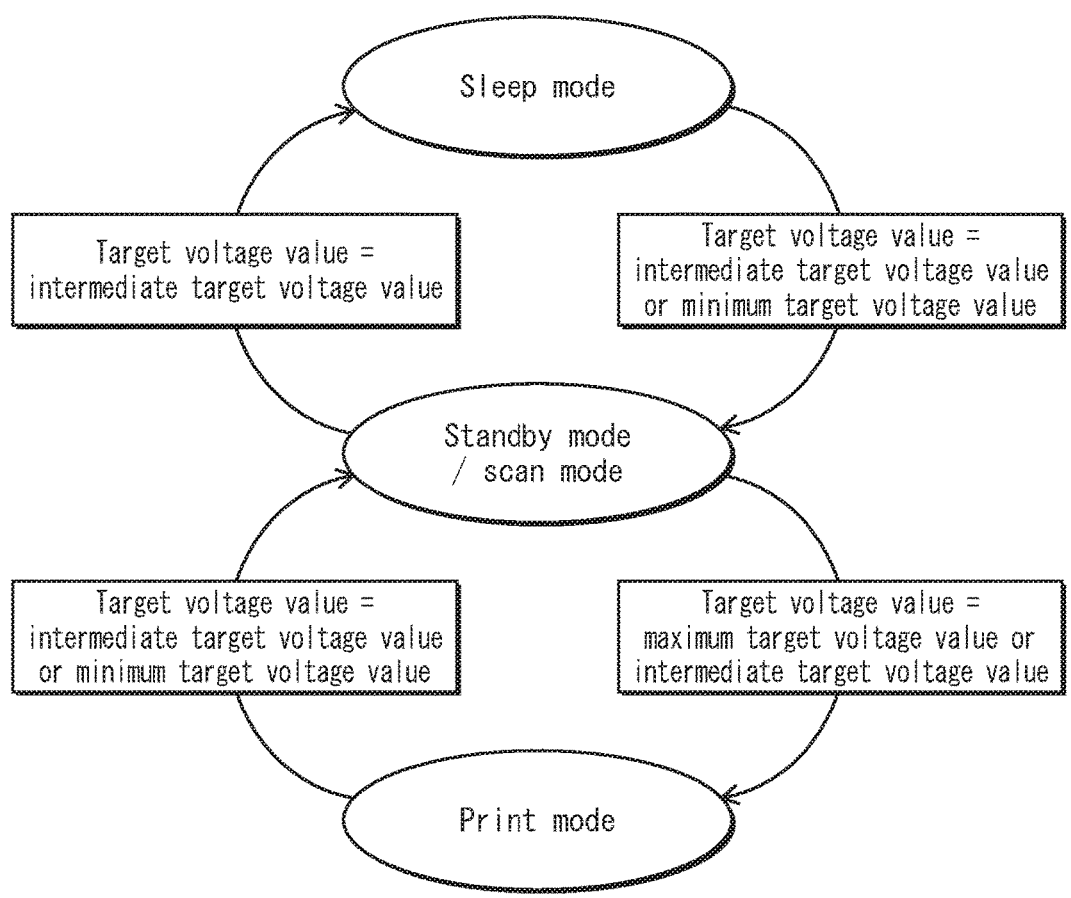
FIG. 6 illustrates transition between different operation modes of the image forming device 1.

Through the processing described above, the target voltage value for the 5 V loads is changed as the operation mode of the image forming device 1 changes, as illustrated in FIG. 6. Specifically, when the operation mode changes from the sleep mode to the standby mode or the scan mode, the target voltage value for the 5 V loads is set to either the intermediate value (5.0 V) or the minimum value (4.9 V), depending upon the operation state of the 5 V loads.

Further, when the operation mode changes from the standby mode or the scan mode to the print mode, the target voltage value for the 5 V loads is set to either the maximum value (5.1 V) or the intermediate value, depending upon the operation state of the 5 V loads. Contrariwise, when the operation mode changes from the print mode to the standby mode or the scan mode, the target voltage value for the 5 V loads is set to either the intermediate value or the minimum value, depending upon the operation state of the 5 V loads.

Further, when the operation mode changes from the standby mode or the scan mode to the sleep mode, the target voltage value for the 5 V loads is set to the intermediate value.

[6] Control of Voltage Supplied to 24 V Loads

The combination of the upper limiter circuit 481 and the control described above achieves limiting the voltage supplied to the 24 V loads to be within ±10% of the 24 V rated voltage.

Figure 7:
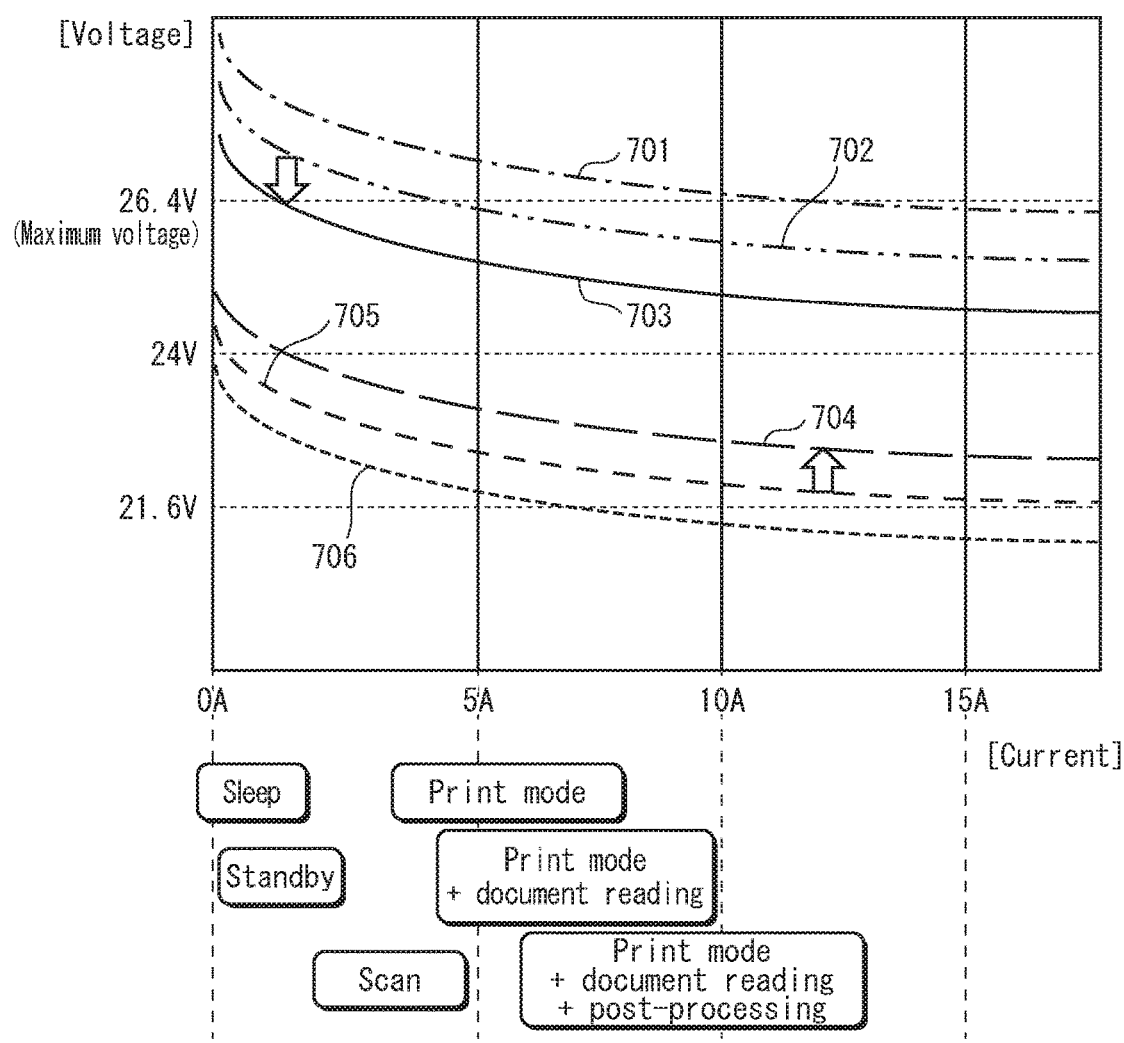
FIG. 7 shows graphs illustrating examples of current-voltage characteristics of 24 V loads.

FIG. 7 shows graphs illustrating examples of current-voltage characteristics of the 24 V loads. In FIG. 7, graph 701 illustrates current-voltage characteristics of the 24 V loads when the target voltage value for the 5 V loads is 5.1 V and the amount of current output to the 5 V loads is 10 A. When all 5 V loads are operating, or that is, when the main 5 V load components, the first additional 5 V load components 310, and the second additional 5 V load components 320 are all operating at the same time, the amount of current output to the 5 V loads reaches 10 A.

Further, graph 702 illustrates current-voltage characteristics of the 24 V loads when the target voltage value for the 5 V loads is 5.1 V and when among the 5 V loads, the main 5 V load components and the first additional 5 V load components 310 are operating but the second additional 5 V load components 320 are not operating, in which case the amount of current output to the 5 V loads is 8 A. From graphs 701 and 702, it can be seen that the greater the amount of current output to the 5 V loads, the greater the voltage supplied to the 24 V loads.

Further, graph 702 shows, for example, that when the amount of current output to the 24 V loads is 1 A, the voltage supplied to the 24 V loads is as high as 28.0 V. In the present embodiment, the maximum voltage set to the upper limiter circuit 481 is 26.4 V. Thus, electric power loss occurring at the upper limiter circuit 481 in this case is calculated as follows.

(28.0 V−26.4 V)×1 A=1.6 W

A Typical Electricity Consumption (TEC) value calculated based on this electric power loss indicates that in an image forming device performing printing at the speed of 28 sheets per minute, this electric power loss amounts to 54 Wh. In an image forming device model having a TEC value of 1350 Wh, this electric power loss corresponds to a power efficiency decrease of approximately 4%.

Meanwhile, in the embodiment, the target voltage value is set to 4.9 V when among the 5 V loads, the main 5 V load components and the first additional 5 V load components 310 are to be operated but the second additional 5 V load components 320 are not to be operated (i.e., when the amount of current to be output to the 5 V loads is 8 A). This reduces the voltage supplied to the 24 V loads compared to when the target voltage value is 5.1 V, as shown by graph 703. By making this configuration, when the amount of current to be output to the 24 V loads is 1 A, the voltage supplied to the 24 V loads decreases from the above-described value of 28.0 V to 26.5 V, in which case the power loss occurring at the upper limiter circuit 481 is as low as around 0.1 W. This corresponds to a power efficiency improvement of 51 Wh (TEC value).

More specifically, without this configuration, the voltage supplied to the 24 V loads would be too high (as shown by graph 701) when YES in S523 in FIG. 5 (i.e., when the operation mode is the standby mode and the main 5 V load components, the first additional 5 V load components 310, and the second additional 5 V load components 320 are all to be operated). Meanwhile, since the target voltage value for the 5 V loads is decreased to 4.9 V in the embodiment (S524), the voltage supplied to the 24 V loads decreases compared to when the target voltage value for the 5 V loads is not decreased. Due to this, the configuration pertaining to the embodiment reduces electric power loss occurring at the upper limiter circuit 481.

Figure 8:
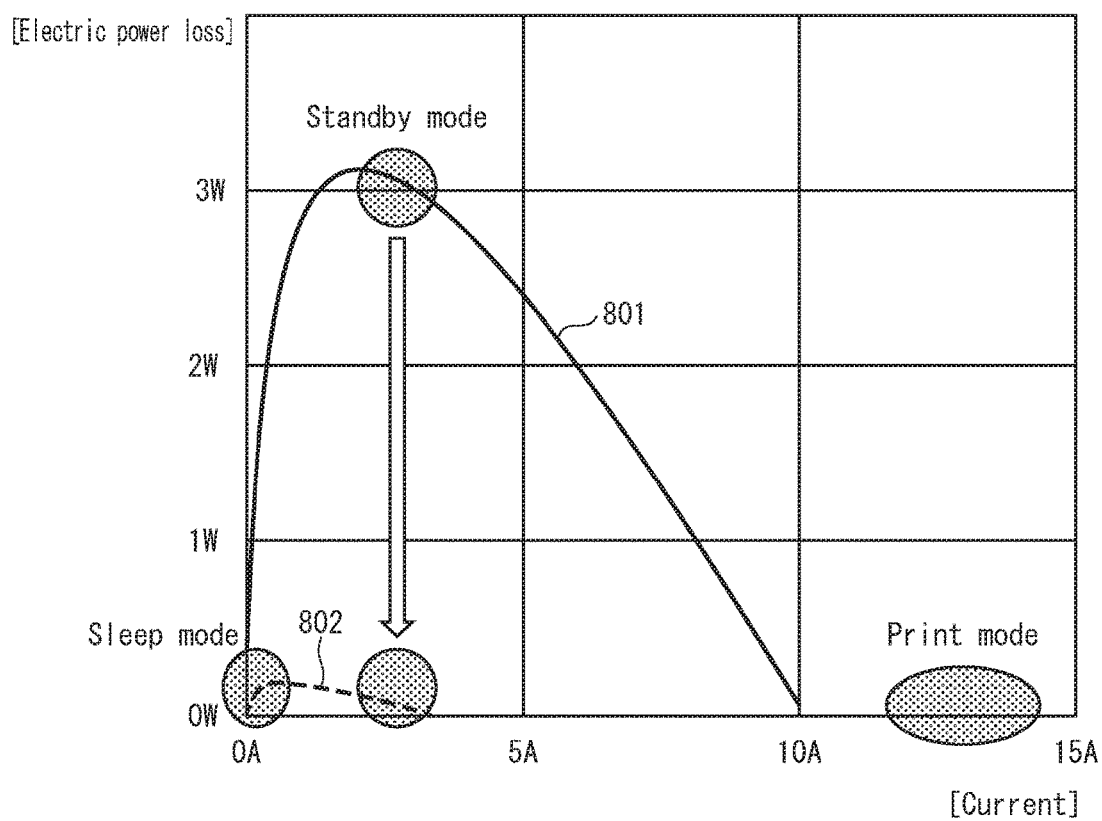
FIG. 8 shows graphs illustrating relationships between electric power loss and current amount for the 24 V loads.

FIG. 8 shows graphs illustrating relationships between electric power loss and the current amount for the 24 V loads. The electric power loss at the upper limiter circuit 481 is small when the operation mode is the sleep mode or the print mode, regardless of whether the target voltage value for the 5 V loads is set to the maximum value (shown by graph 801 in FIG. 8) or to the minimum value (shown by graph 802 in FIG. 8).

Meanwhile, the electric power loss at the upper limiter circuit 481 reaches 3 W or greater (shown by graph 801 in FIG. 8) when the target voltage value for the 5 V loads is set to the maximum value 5.1 V, the amount of current to be supplied to the 5 V loads is 10 A, and the operation mode is the standby mode.

However, even when the amount of current to be output from the 5 V loads is 10 A and the operation mode is the standby mode, the electric power loss occurring can be reduced to as low as around 0.1 W (shown by graph 802 in FIG. 8) by setting the target voltage value for the 5 V loads to 4.9 V. As such, the electric power loss occurring at the upper limiter circuit 481 can be reduced by setting a low target voltage value for the 5 V loads.

Meanwhile, when only the main 5 V load components among the 5 V loads are to be operated, the amount of current to be output from the 5 V loads is as low as 1 A. When setting the target voltage value for the 5 V loads to 4.9 V in such a case, the voltage supplied to the 24 V loads becomes low, as shown by graph 706 in FIG. 7. In particular, when the operation mode is the print mode and the image reader 110 is to be operated or both the image reader 110 and the sheet post-processor 120 are to be operated, the voltage supplied to the 24 V loads falls below the rated voltage range of 24 V±10%.

Meanwhile, in the embodiment, the target voltage value for the 5 V loads is set to 5.0 V in such a case. This increases the voltage supplied to the 24 V loads compared to when the target voltage value is 4.9 V, as shown by graph 705. Also, further increasing the target voltage value for the 5 V loads to 5.1 V results in a further increase in the voltage supplied to the 24 V loads, as shown by graph 704. As a result, the voltage supplied to the 24 V loads becomes close to exactly 24.0 V.

More specifically, without this configuration, the voltage supplied to the 24 V loads would be too low (as shown by graph 706) when YES in S506 in FIG. 5 (i.e., when the operation mode of the image forming device 1 is the print mode, both the image reader 110 and the sheet post-processor 120 are to be operated among the 24 V loads, and only the main 5 V load components is to be operated among the 5 V loads). Meanwhile, since the target voltage value for the 5 V loads is increased to 5.1 V in the embodiment (S507 in FIG. 5), the voltage supplied to the 24 V loads increases compared to when the target voltage value for the 5 V loads is not increased, to be within the rated voltage range.

[7] Modifications

Up to this point, description has been provided of the technology pertaining to the present disclosure based on an embodiment thereof. However, the technology pertaining to the present disclosure shall not be construed as being limited to the embodiment, and modifications including those described in the following can be made without departing from the spirit and scope thereof.

(1) The embodiment provides description based on an example where the upper limiter circuit 481 is used to limit the voltage supplied to the 24 V loads to a predetermined maximum voltage. As long as the voltage supplied to the 24 V loads can be decreased by decreasing the voltage supplied to the 5 V loads, electric power loss at the upper limiter circuit 481 can be reduced regardless of the circuit structure of the upper limiter circuit 481.

(2) The embodiment provides description based on an example where the output voltage monitor 471 sets the target voltage value for the 5 V loads based on the operation mode signal and the load signal. However, the following modification may be made, for example.

For example, the control unit 200 may set the target voltage value to the output voltage monitor 471 by referring to the operation mode and the load state of the image forming device 1. This modification simplifies the structure of the output voltage monitor 471, and thus reduces the cost and size of the power supply device 100.

(3) The embodiment provides description based on an example where, in S522 in FIG. 5, the operation state of the 5 V loads is checked and the target voltage value for the 5 V loads is changed. However, the target voltage value for the 5 V loads may be changed depending upon the device structures of the 5 V loads, instead of the operation state of the 5 V loads. When making this modification, the decision of YES may be made in S523 when the main 5 V load components, the first additional 5 V load components 310, and the second additional 5 V load components 320 are all mounted on or attached to the image forming device 1, and the decision of NO may be made in S523 when at least one of the first additional 5 V load components 310 and the second additional 5 V load components 320 is not mounted on or attached to the image forming device 1.

Further, in S503 of FIG. 5, instead of checking the operation state of the 24 V loads to determine whether or not to change the target voltage value for the 5 V loads, a determination may be made of whether or not the image reader 110 and the sheet post-processor 120 are mounted onto the image forming device 1. When making this modification, the decision of YES may be made in S504 when both the image reader 110 and the sheet post-processor 120 are mounted onto the image forming device 1, and the decision of NO may be made in S504 when at least one of the image reader 110 and the sheet post-processor 120 is not mounted onto the image forming device 1. Making such modifications similarly achieves the effects described in the embodiment.

(4) The embodiment describes an example where the power supply device 100 outputs 5 V DC as the low voltage and 24 V DC as the high voltage. However, the low voltage need not be 5 V, and the high voltage need not be 24 V. Further, the maximum and minimum of the target voltage value for the 5 V loads need not be 5.1 V and 4.9 V, respectively. Any value within the rated voltage range of the 5 V loads may be set to each of the maximum and the minimum of the target voltage value for the 5 V loads. Further, the rated voltage range of the voltage supplied to the 24 V loads need not be the ±10% range described in the embodiment, and may be replaced with another range.

(5) The embodiment describes an example where the image forming device 1 is a MFP having the tandem system. However, the image forming device 1 may for example be a MFP not having the tandem system, or may be a monochrome MFP. Further, the technology pertaining to the present disclosure achieves similar effects also when applied to a MFP not having a facsimile communication function.

Although the technology pertaining to the present disclosure has been fully described by way of examples with reference to the accompanying drawings, it is to be noted that various changes and modifications will be apparent to those skilled in the art. Therefore, unless otherwise such changes and modifications depart from the scope of the technology pertaining to the present disclosure, they should be construed as being included therein.

What is claimed is:

1. A power supply device for an image forming device that is provided with a first load and a second load that operates at a higher voltage than the first load, and that operates by switching between operation modes, the power supply device comprising:

a transformer configured to generate, from an input voltage, a first output voltage from a first secondary coil for the first load and a second output voltage from a second secondary coil for the second load, wherein the first load and the second load are external loads outside of the power supply device, and the first output voltage is lower than the second output voltage;

an upper limiter circuit configured to receive the second output voltage from the transformer, and control the second output voltage not to exceed a maximum;

a power controller configured to perform feedback control on the input voltage so that the low output voltage matches a target voltage;

an operation mode acquirer configured to acquire an operation mode of the image forming device; and a target value controller configured to change the target voltage depending upon the acquired operation mode by:

when the acquired operation mode is a first current consumption mode, setting the target voltage so that the second output voltage does not fall below a minimum of a rated voltage range of the second output voltage, wherein the first current of the first current consumption mode is higher than the second current of the second current consumption mode, and when the acquired operation mode is a second current consumption mode, setting the target voltage lower than the target voltage when the acquired operation mode is the first current consumption mode;

the image forming device consuming a greater amount of current with the second output voltage in the first current consumption mode than in the second current consumption mode.

2. The power supply device of claim 1, wherein
when the acquired operation mode is the second current consumption mode, the greater the amount of the current with the first output voltage to be output to the first load, the lower the target voltage set by the target value controller.

3. The power supply device of claim 1, wherein
when the acquired operation mode is the first current consumption mode, the greater the amount of the current with the first output voltage to be output to the first load, the higher the target voltage set by the target value controller.

4. The power supply device of claim 1, wherein
when in the first current consumption mode, the image forming device is capable of performing image forming immediately, and
when the acquired operation mode is the first current consumption mode and the current with the first output voltage is to be output to the first load at a predetermined amount or more, the target voltage set by the target voltage controller equals a minimum of a rated voltage range of the first output voltage.

5. The power supply device of claim 1, wherein
the target voltage controller judges the amount of the current with the second output voltage to be output to the second load based on an operation state of the first load or a device structure of the second load.

6. The power supply device of claim 2, wherein
the target voltage controller judges the amount of the current with the first output voltage to be output to the first load based on an operation state of the first load or a device structure of the first load.

7. The power supply device of claim 6, wherein
the first load includes at least one of a hard disk drive attached to the image forming device, a facsimile communication unit of the image forming device, and a print controller unit of the image forming device.

8. A power supply device for an image forming device that is provided with a first load and a second load that operates at a higher voltage than the first load, and that operates by switching between operation modes, the power supply device comprising:
a transformer configured to generate, from an input voltage, a first output voltage from a first secondary coil for the first load and a second output voltage from a second secondary coil for the second load;
an upper limiter circuit configured to receive the second output voltage from the transformer, and control the second output voltage not to exceed a maximum;
a power controller configured to perform feedback control on the input voltage so that the low output voltage matches a target voltage;
an operation mode acquirer configured to acquire an operation mode of the image forming device; and
a target value controller configured to change the target voltage depending upon the acquired operation mode by:
when the acquired operation mode is a first current consumption mode, setting the target voltage so that the second output voltage does not fall below a minimum of a rated voltage range of the second output voltage, and
when the acquired operation mode is a second current consumption mode, setting the target voltage lower than the target voltage when the acquired operation mode is the first current consumption mode;
the image forming device consuming a greater amount of current with the second output voltage in the first current consumption mode than in the second current consumption mode;
wherein
the second load includes:
an image reader unit of the image forming device, the image reader unit including an automatic document feeder; and
a post-processor unit of the image forming device, the power-processor unit performing post-processing on a sheet stack, the sheet stack composed of one or more recording sheets already having images formed thereon, and
when the acquired operation mode is the first current consumption mode and both the image reader unit and the post-processor unit are to be operated, the target voltage set by the target voltage controller equals a maximum of a rated voltage range of the first output voltage.

9. An image forming device that comprises a power supply device, that is provided with a first load and a second load that operates at a higher voltage than the first load, and that operates by switching between operation modes, the power supply device comprising:
a transformer configured to generate, from an input voltage, a first output voltage from a first secondary coil for the first load and a second output voltage from a second secondary coil for the second load, wherein the first load and the second load are external loads outside of the power supply device, and the first output voltage is lower than the second output voltage;
an upper limiter circuit configured to receive the second output voltage from the transformer, and control the second output voltage not to exceed a maximum;
a power controller configured to perform feedback control on the input voltage so that the first output voltage matches a target voltage;
an operation mode acquirer configured to acquire an operation mode of the image forming device; and
a target value controller configured to change the target voltage depending upon the acquired operation mode, the target voltage, when the acquired operation mode is a first current consumption mode, ensuring that the second output voltage does not fall below a minimum of a rated voltage range of the second output voltage, the target voltage, when the acquired operation mode is a second current consumption mode, being lower than the target voltage when the acquired operation mode is the first current consumption mode, the image forming device consuming a greater amount of current with the second output voltage in the first current consumption mode than in the second current consumption mode, wherein the first current of the first current consumption mode is higher than the second current of the second current consumption mode.

* * * * *